United States Patent
Sun

(10) Patent No.: US 6,746,216 B2
(45) Date of Patent: Jun. 8, 2004

(54) SCROLL COMPRESSOR WITH VENTED OIL PUMP

(75) Inventor: Zili Sun, Arkadelphia, AR (US)

(73) Assignee: Scroll Technologies, Arkadelphia, AR (US)

( * ) Notice: Subject to any disclaimer, the term of this patent is extended or adjusted under 35 U.S.C. 154(b) by 10 days.

(21) Appl. No.: 10/199,615

(22) Filed: Jul. 19, 2002

(65) Prior Publication Data

US 2004/0013542 A1 Jan. 22, 2004

(51) Int. Cl.[7] .......................... F04B 23/00; F04B 17/00; F01M 1/00; F16C 1/24
(52) U.S. Cl. .................... 417/410.5; 417/313; 417/365; 417/423.13; 184/6.16; 184/6.18; 384/368; 384/371; 384/415
(58) Field of Search ................................. 417/313, 365, 417/423.13, 424.1, 410.5; 418/55.1; 184/6.16, 6.18; 384/368, 371, 415

(56) References Cited

U.S. PATENT DOCUMENTS

| | | | | |
|---|---|---|---|---|
| 2,905,510 A | * | 9/1959 | Gardiner | 308/134.1 |
| 3,075,686 A | * | 1/1963 | Steinhagen | 417/363 |
| 3,692,435 A | * | 9/1972 | Iida et al. | 417/372 |
| 4,565,503 A | * | 1/1986 | Wise | 417/372 |
| 4,623,306 A | * | 11/1986 | Nakamura et al. | 418/55.6 |
| 4,696,628 A | * | 9/1987 | Kimura et al. | 418/15 |
| 4,877,381 A | * | 10/1989 | Johnson et al. | 418/55.6 |
| 5,554,015 A | * | 9/1996 | Dreiman et al. | 417/415 |
| 5,931,649 A | * | 8/1999 | Caillat et al. | 418/55.1 |
| 6,171,090 B1 | * | 1/2001 | Hurley | 418/94 |

* cited by examiner

Primary Examiner—Justine R. Yu
Assistant Examiner—Timothy P. Solak
(74) Attorney, Agent, or Firm—Carlson, Gaskey & Olds

(57) ABSTRACT

An oil pump for a scroll compressor has a bearing hub with a vent disposed between at least one fluid inlet in the bearing hub and a thrust washer. The vent provides an additional fluid flow path to equalize fluid pressure underneath the thrust washer. By minimizing or eliminating low fluid pressure zones with the bearing hub, fluid flow through the oil pump can be maintained at a constant level.

20 Claims, 2 Drawing Sheets

SCROLL COMPRESSOR WITH VENTED OIL PUMP

TECHNICAL FIELD

The invention relates to scroll compressors, and more particularly to a venting structure for an oil pump in the scroll compressor.

BACKGROUND OF THE INVENTION

Scroll compressors are widely used in refrigerant compression applications. A scroll compressor typically includes two interfitting scroll members. Each scroll member has a base with a generally spiraling scroll wrap extending from the base. The wraps interfit to define a plurality of compression chambers. One scroll member acts as a non-orbiting scroll member while the other scroll member acts as an orbiting scroll member and orbits relative to the non-orbiting scroll member. The relative rotation causes the wrap in the orbiting scroll member to orbit relative to the wrap in the non-orbiting scroll member, changing the volume of the compression chambers. This changing volume compresses refrigerant trapped in the compression chambers.

An input shaft driven by a motor rotates the orbiting scroll member. The input shaft has an oil supply passage extending along its length. The lower portion of the input shaft is mounted to a bearing structure having one or more inlets that fluidically couple the oil supply passage in the shaft with an oil supply that often contains some liquid refrigerant dissolved in it. A thrust washer placed between the input shaft and the bearing structure has an opening to allow fluid to reach the input shaft. Because the inlets are spaced apart from the thrust washer, however, the fluid flow through the inlets may generate low pressure zones around the inlets.

The refrigerant dissolved in the oil supply is often in a liquid state that is just below its vaporization point. Sudden drops in pressure, such as in the low pressure zones, causes the dissolved refrigerant to vaporize, creating bubbles in the oil around the bearing structure. These bubbles interfere or interrupt oil flow and can potentially cause bearing damage.

There is a desire for an oil pump structure that prevents low fluid pressure areas from forming around the bearing structure.

SUMMARY OF THE INVENTION

Accordingly, the present invention is directed to an oil pump configuration having a vented bearing member. The vent is disposed between at least one fluid inlet in the bearing member and a thrust washer placed between the bearing member and an input shaft in the pump. The vent equalizes fluid pressure by reducing or eliminating potential low pressure zones caused by fluid separation within the bearing member.

In one embodiment, the vent is vertically aligned with the fluid inlet. In another embodiment, the vent may be staggered above and between two inlets. In both embodiments, the vents may be placed in any position between the thrust washer and the inlets, including directly beneath the thrust washer.

DETAILED DESCRIPTION OF THE EMBODIMENTS

Figure 1:
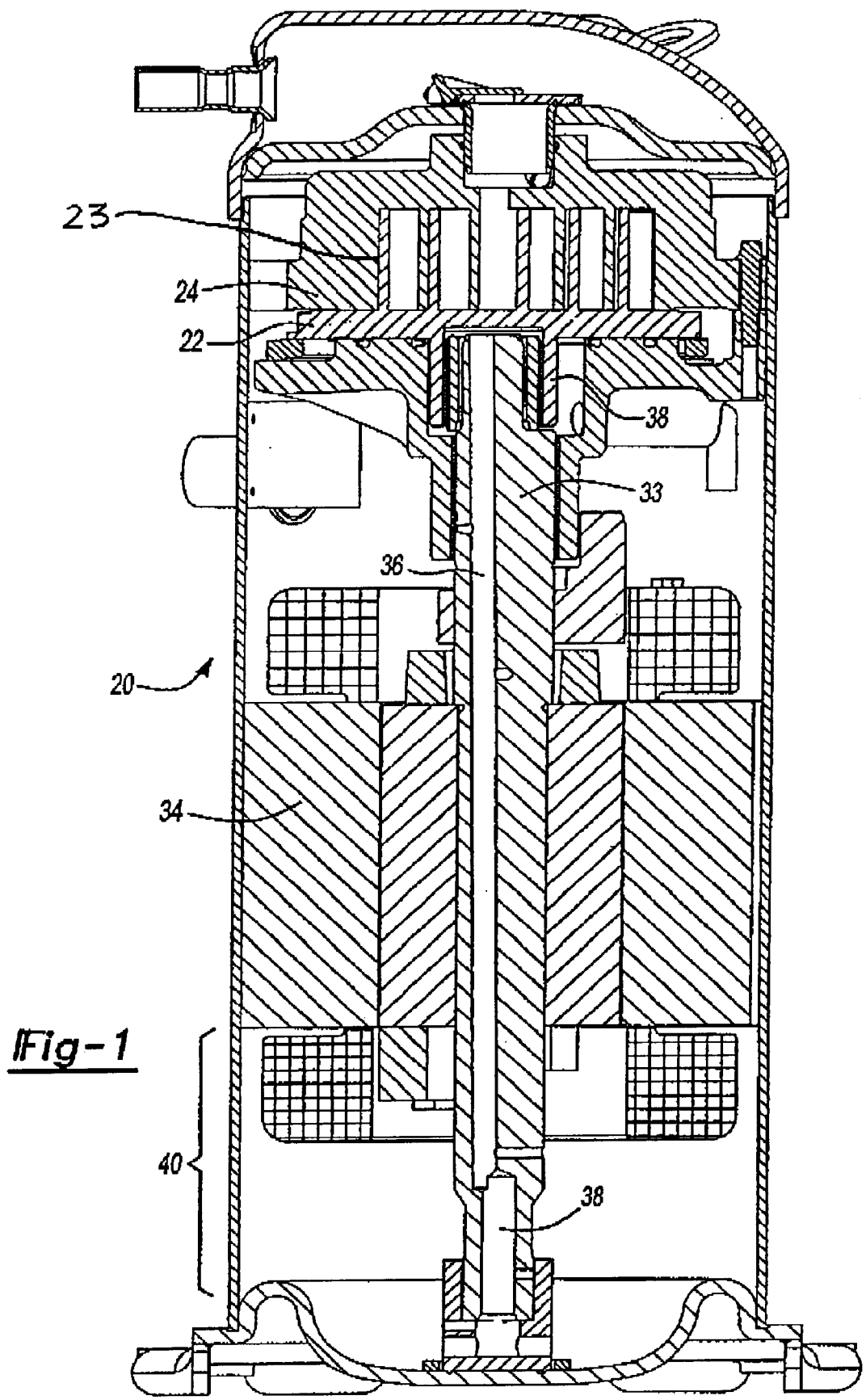
FIG. 1 is a cross-sectional view of a scroll compressor incorporating one embodiment of the invention.

FIG. 1 illustrates a scroll compressor 20 according to one embodiment of the invention. The scroll compressor 20 includes an orbiting scroll 22 having a generally spiral wrap 23 that interfits with a non-orbiting scroll 24 to define compression chamber. The orbiting scroll 22 is coupled to orbit an input shaft 33 driven by a motor 34.

The input shaft 33 includes a straight hole 38 and an eccentric hole 36 machined along the length of the shaft 33. The straight hole 38 and the eccentric hole 36 together form an oil supply passage for an oil pump. As is known in the art, the input shaft 33 rotates, drawing oil upward via centrifugal force to lubricate bearings along the oil's path in the scroll compressor 20.

Figure 2:
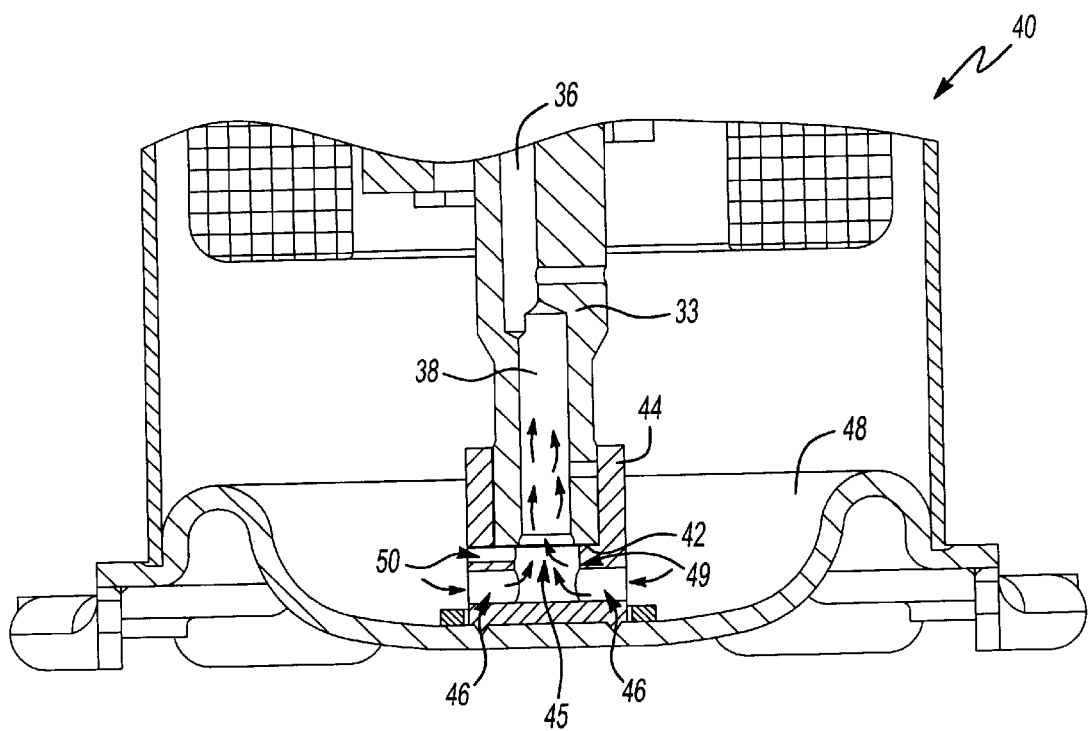
FIG. 2 is a cross-sectional view of an oil pump for a scroll compressor according to one embodiment of the invention.

FIG. 2 illustrates an actuating portion 40 of the oil pump according to one embodiment of the invention in greater detail. The input shaft 33 rests on a thrust washer 42 disposed in a bearing member, such as a bearing hub 44. The thrust washer 42 is preferably annular with its opening 45 aligned with the straight hole 38 to allow fluid flow through the thrust washer opening 45 directly into the straight hole 38. Further, the thrust washer opening 45 should be smaller than the straight hole 38 to ensure that oil is sent to the center of the straight hole 38 and not driven outside of the thrust washer opening 45 via centrifugal forces inside the straight hole 38. The thrust washer 42 separates the relatively stationary oil in the bearing hub 44 from the spinning oil inside the input shaft 33.

The bearing hub 44 includes at least one inlet 46, forming a continuous fluid path from an oil supply area 48 to the straight hole 38. The inlets 46 may extend radially toward the thrust washer opening 45. Normally, fluid pressure may drop as fluid travels around a corner of the inlet toward the thrust washer opening 45 because the fluid will reach the thrust washer opening 45 slightly before the area underneath the thrust washer 42 fills completely with the fluid. As is known in the fluid dynamics art, fluid will travel along the shortest path available. Any sudden changes in the fluid path, such as sharp corners 49, normally would cause fluid separation and create a low-pressure vortex inside the bearing hub 44.

To equalize the fluid pressure inside the bearing hub 44, a vent 50 is formed in the bearing hub 44 at a location above the inlets 46 and, in this embodiment, directly adjacent to (e.g., directly below) the thrust washer 42. The vent 50 eliminates the formation of low fluid pressure areas around the thrust washer 42 by equalizing the pressures beneath the thrust washer 42 and oil supply area 48. More particularly, the vent 50 provides an extra fluid path directly beneath the thrust washer 42, reducing or even eliminating the space between the thrust washer 42 and at least one of the inlets 46. Fluid traveling through the vent 50 therefore does not encounter any sudden changes in its fluid path, eliminating any sudden fluid pressure drops. By keeping the fluid pressure in the bearing hub 44 consistent, any liquid refrigerant dissolved in the oil will remain dissolved and will not vaporize due to low pressure zones within the bearing hub 44.

Figure 3:
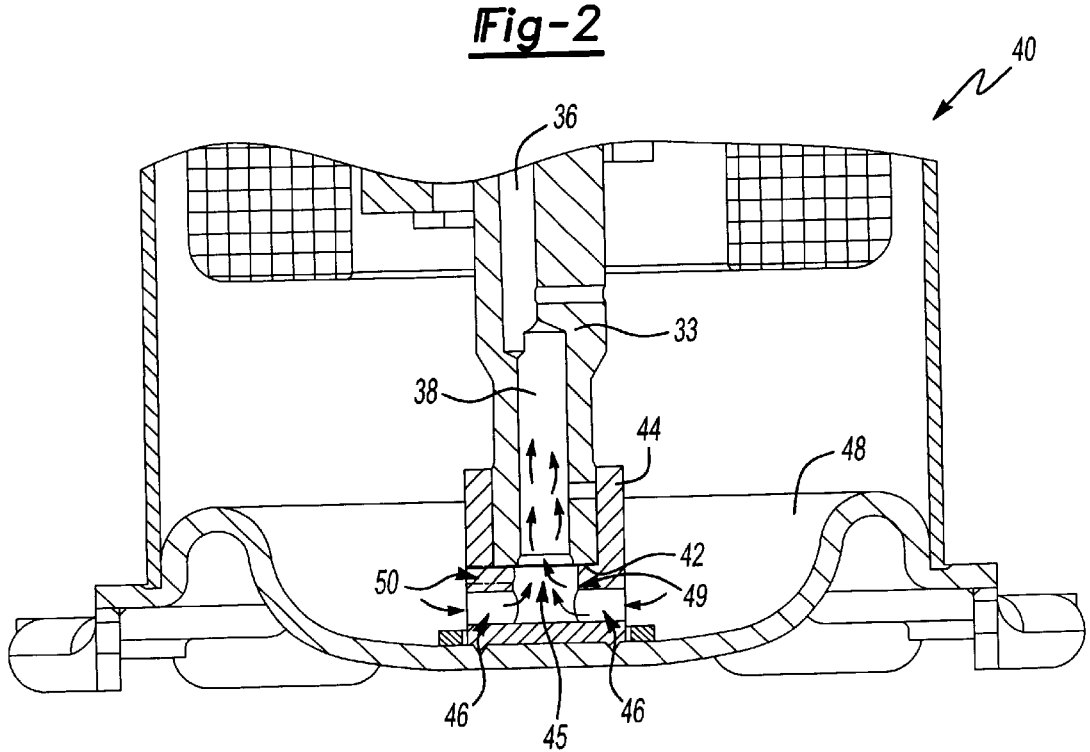
FIG. 3 is a cross-sectional view of an oil pump for a scroll compressor according to another embodiment of the invention.

Note that although the description above assumes that the vent is directly below the thrust washer, an oil pump having any number of vents in any position between the thrust washer and the inlets falls within the scope of the invention. Further, the vent does not need to be vertically aligned with any of the inlets to be considered "between" the inlets and the thrust washer; the vent can simply be placed at a plane different than the plane occupied by the inlets. For example, as shown in FIG. 3, the vent 50 may be staggered above and between two inlets and still be considered "between" the thrust washer and the inlets 46 even though the vent 50 is not vertically aligned with the inlet 46 like the embodiment shown in FIG. 2.

Any venting between the inlet and the thrust washer will reduce the size of any potential low pressure zone in the bearing hub. Minimizing low pressure zones keeps the fluid pressure in the oil pump stable and prevents bubbles from forming due to vaporization of refrigerant dissolved in the oil, especially during transient pump conditions. As a result, the inventive structure prevents bubbles from interfering with or blocking oil flow into the input shaft 33.

Although a preferred embodiment of this invention has been disclosed, a worker of ordinary skill in the art would recognize that certain modifications would come within the scope of this invention. For that reason, the following claims should be studied to determine the true scope and content of this invention.

What is claimed is:

1. A vented apparatus for an fluid pump having an input shaft, comprising:
   a thrust washer having an opening fluidically coupled to the fluid supply passage of the input shaft; and
   a bearing member that can accommodate the input shaft, wherein the thrust washer is disposed in the bearing member, the bearing member having at least one inlet fluidically coupled to the thrust washer opening,
   wherein the bearing member has at least one vent disposed between the thrust washer and said at least one inlet, and wherein said at least one vent is fluidically coupled to the thrust washer opening.

2. The vented apparatus of claim 1, wherein said at least one vent is disposed adjacent to the thrust washer.

3. The vented apparatus of claim 1, wherein the bearing member has a plurality of vents.

4. The vented apparatus of claim 1, wherein the bearing member has a plurality of inlets.

5. The vented apparatus of claim 1, wherein the vent is vertically aligned with and substantially parallel to one of said at least one inlets.

6. The vented apparatus of claim 1, wherein said at least one vent is defined by the thrust washer and the bearing member.

7. The vented apparatus of claim 1, wherein oil flows through the vent and said at least one inlet, and the oil flowing through said at least one vent has a lower fluid pressure drop than the oil flowing through the at least one inlet.

8. A compressor, comprising:
   a compressor pump;
   an input shaft for driving said compressor pump and having a fluid supply passage;
   a thrust washer having an opening fluidically coupled to the fluid supply passage; and
   a bearing member coupled to the input shaft, wherein the thrust washer is disposed between the bearing member and the input shaft, the bearing member having at least one inlet fluidically coupled to the thrust washer opening,
   wherein the bearing member has at least one vent disposed between the thrust washer and said at least one inlet, and wherein said at least one vent is fluidically coupled to the thrust washer opening.

9. The compressor of claim 8, wherein said at least one vent is disposed adjacent to the thrust washer.

10. The compressor of claim 8, wherein the bearing member has a plurality of vents.

11. The compressor of claim 8, wherein the bearing member has a plurality of inlets.

12. The compressor of claim 8, wherein the vent is vertically aligned with and substantially parallel to one of said at least one inlets.

13. The compressor of claim 8, wherein said vent is defined by the thrust washer and the bearing member.

14. The compressor of claim 8, wherein oil flows through the vent and said at least one inlet, and the oil flowing through said at least one vent has a lower fluid pressure drop than the oil flowing through said at least one inlet.

15. A scroll compressor, comprising:
   a first scroll including a base and scroll wrap extending from said base;
   a second scroll including a base and a scroll wrap extending from said base, said scroll wraps of said first and second scrolls interfitting to define a plurality of compression chambers;
   an input shaft coupled to the second scroll and having a fluid supply passage;
   a thrust washer having an opening fluidically coupled to the fluid supply passage;
   a bearing member coupled to the input shaft, wherein the thrust washer is disposed between the bearing member and the input shaft, the bearing member having a plurality of inlets fluidically coupled to the thrust washer opening, wherein the bearing member has at least one vent disposed between the thrust washer and at least one of said plurality of inlets, and wherein said at least one vent is fluidically coupled to the thrust washer opening; and
   a fluid supply area fluidically coupled to said plurality of inlets.

16. The scroll compressor of claim 15, wherein said at least one vent is disposed adjacent to the thrust washer.

17. The scroll compressor of claim 15, wherein the beating member has a plurality of vents.

18. The scroll compressor of claim 15, wherein the vent is vertically aligned with and substantially parallel to one of said plurality of inlets.

19. The scroll compressor of claim 15, wherein said at least one vent is defined by the thrust washer and the bearing member.

20. The scroll compressor of claim 15, wherein oil flows through the vent and said at least one inlet, and the oil flowing through said at least one vent has a lower fluid pressure drop than the oil flowing through said at least one inlet.

* * * * *

UNITED STATES PATENT AND TRADEMARK OFFICE
CERTIFICATE OF CORRECTION

PATENT NO.     : 6,746,216 B2
DATED          : June 8, 2004
INVENTOR(S)    : Sun It is certified that error appears in the above-identified patent and that said Letters Patent is hereby corrected as shown below:

Column 3,
Line 29, "the" should be -- a --

Column 4,
Line 48, "beating" should be -- bearing --

Signed and Sealed this

Seventeenth Day of August, 2004

JON W. DUDAS
*Acting Director of the United States Patent and Trademark Office*